(12) United States Patent
Hirose

(10) Patent No.: US 7,763,806 B2
(45) Date of Patent: Jul. 27, 2010

(54) SUPERCONDUCTING CABLE

(75) Inventor: Masayuki Hirose, Osaka (JP)

(73) Assignee: Sumitomo Electric Industries, Ltd., Osaka-shi, Osaka (JP)

(*) Notice: Subject to any disclaimer, the term of this patent is extended or adjusted under 35 U.S.C. 154(b) by 14 days.

(21) Appl. No.: 12/296,613

(22) PCT Filed: Apr. 12, 2006

(86) PCT No.: PCT/JP2006/307733
§ 371 (c)(1),
(2), (4) Date: Oct. 9, 2008

(87) PCT Pub. No.: WO2007/122670
PCT Pub. Date: Nov. 1, 2007

(65) Prior Publication Data
US 2009/0124505 A1 May 14, 2009

(51) Int. Cl.
H01B 12/00 (2006.01)
(52) U.S. Cl. .................. 174/125.1; 505/230
(58) Field of Classification Search ............. 174/15.4, 174/15.5, 125.1; 505/230–232
See application file for complete search history.

(56) References Cited

U.S. PATENT DOCUMENTS

2005/0173149 A1* 8/2005 Gouge et al. ............. 174/125.1

FOREIGN PATENT DOCUMENTS

| JP | 58-81819 | 6/1983 |
|----|----------|--------|
| JP | 58-81820 | 6/1983 |
| JP | 07-201230 | 8/1995 |
| JP | 07-201233 | 8/1995 |
| JP | 11-066982 | 3/1999 |
| JP | 2000-067663 | 3/2000 |
| JP | 2001-202837 | 7/2001 |
| JP | 2001-325838 | 11/2001 |

* cited by examiner

Primary Examiner—Jeremy C Norris
(74) Attorney, Agent, or Firm—Drinker Biddle & Reath LLP

(57) ABSTRACT

There is provided a superconducting cable allowing a simple configuration to absorb an amount of contraction of normal conducting wire caused as it is cooled. The present superconducting cable has a superconducting layer (a superconducting conductor layer, a superconducting shield layer) and a normal conducting layer (a normal conducting conductor layer, a normal conducting shield layer) disposed at at least one of inner and outer sides of the superconducting layer. The superconducting cable has a stress relaxation layer at an inner side of the normal conducting layer, and the superconducting cable has the stress relaxation layer absorb an amount of radial contraction of the normal conducting layer caused as it is cooled by a coolant.

8 Claims, 2 Drawing Sheets

SUPERCONDUCTING CABLE

TECHNICAL FIELD

The present invention relates to superconducting cables. The present invention particularly relates to superconducting cables capable of absorbing that contraction of a normal conducting layer configuring the superconducting cable which is caused as it is cooled.

BACKGROUND ART

As a superconducting cable, a superconducting cable illustrated in FIG. 4 has been proposed. The superconducting cable 100 is configured to accommodate 3 cable cores 10 in a heat insinuating tube 20 (see Patent Document 1 for example).

The cable core 10 includes a former 11, a superconducting conductor layer 12, an insulating layer 15, a superconducting shield layer 16, and a protection layer 18 successively from a center thereof. Normally, former 11 is configured of stranded wire, a pipe member, and/or the like. The conductor layer 12 is configured by spirally winding superconducting wire on former 11 in multiple layers. Representatively, there is used a superconducting wire in a form of tape in which a plurality of pieces of filaments comprising an oxide superconducting material are arranged in a matrix of a silver sheath or the like. For an alternate current cable, an outer superconducting wire in conductor layer 12 reduces an increased density of a current, i.e., non-uniform current distribution, and hence ac loss. Accordingly, each layer may have its superconducting wire wound with a different pitch. The insulating layer 15 is configured by winding insulating paper. The shield layer 16 is configured by spirally winding on the insulating layer 15 a superconducting wire similar to the conductor layer 12. Further, insulating paper or the like is used for the protection layer 18.

The heat insulating tube 20 is a double tube, which includes an inner tube 21 and an outer tube 22, with thermal insulator (not shown) posed therebetween, and is internally vacuumed. A corrosion resistant layer 23 is formed at an outer side of the heat insulating tube 20. Further, the cable is used such that a coolant of liquid nitrogen or the like is introduced into and circulated through a space formed in the former 11 (if it is hollow) or between the inner tube 21 and the core 10 and the insulating layer 15 is impregnated with the coolant.

For such a superconducting cable as described above, it is necessary to ensure a fault-current shunt to prevent for example in an accidental short circuit or the like a fault current from flowing through the superconducting wire and resulting in excessively increased temperature damaging the wire. Accordingly, there has been proposed combining normal conducting material with the superconducting cable's constituent materials. For example, patent document 2 discloses providing a normal conducting metal layer serving as a fault-current shunt at an outer side of a conductor layer formed of superconducting wire. Furthermore, patent document 3 discloses that a stranded wire structure formed of insulated coated wire formed of normal conducting material is used as a material for a core member (or former) to serve as a fault-current shunt.

Patent Document 1: Japanese Patent Laying-open No. 2001-202837 (FIG. 1)
Patent Document 2: Japanese Patent Laying-open No. 2000-67663
Patent Document 3: Japanese Patent Laying-open No. 2001-325838

DISCLOSURE OF THE INVENTION

Problems to be Solved by the Invention

When such a superconducting cable as described above is in operation, the cable has its constituent materials cooled by a coolant to cryogenic temperature and thus contracted, and accordingly, a structure absorbing such contraction is demanded. However, there has not been proposed a structure appropriate for absorbing such contraction for a member configured of normal conducting material, in particular, of the superconducting cable's constituent materials.

For a configuration having three cable cores, the cores can be twisted to slack or the like to absorb contraction of the cable's constituent materials. In that case, however, the cable needs an outer diameter increased to correspond to the slack of the cores. In contrast, a monocore superconducting cable cannot take such an approach as done for the 3-core cable. When the superconducting and normal conducting wires' contraction caused as the cable is cooled is insufficiently absorbed, stress acts on the wires. This may invite degradation of the superconducting wire, or as the cable contracts, side pressure may be exerted to a portion of the heat insulating tube that is located at a bent portion of the cable, resulting in impaired heat insulation.

The present invention has been made in view of the above-described situation and it is a main object thereof to provide a superconducting cable capable of maximally absorbing by a simple configuration an amount of contraction of a normal conducting layer of the superconducting cable's constituent materials that is caused as the cable is cooled.

Further, it is another object of the present invention to provide a superconducting cable capable of maximally absorbing by a simple configuration an amount of contraction of a normal conducting layer of the superconducting cable's constituent materials and in addition that of contraction of a superconducting layer of the superconducting cable's constituent materials, that are caused as the cable is cooled.

Further, it is still another object of the present invention to provide a superconducting cable that is capable of maximally absorbing by a simple configuration an amount of contraction of a normal conducting layer caused as the cable is cooled, and that is also capable of reducing the amount of normal conducting material used.

Means for Solving the Problems

According to the present invention, there is provided a superconducting cable comprising a superconducting layer and a normal conducting layer disposed at at least one of inner and outer sides of the superconducting layer, the superconducting cable being configured to: have a stress relaxation layer at an inner side of the normal conducting layer; and have the stress relaxation layer absorb at least a portion of an amount of radial contraction of the normal conducting layer caused as it is cooled by a coolant.

The stress relaxation layer provided at the inner side of the normal conducting layer absorbs at least a portion of an amount corresponding to that of radial contraction of the normal conducting layer that accompanies contraction of the normal conducting layer caused as it is cooled (i.e., an amount by which the normal conducting layer decreases in diameter as it is cooled). This can reduce tension caused in the normal conducting layer. Furthermore, as the normal conducting layer radially contracts, a radial contraction effect is also caused at the superconducting layer, and the stress can be reduced that is caused when superconducting wire wound with a short pitch, in particular, contracts as it is cooled.

A configuration of the superconducting cable according to the present invention will now be described hereinafter in details.

The superconducting cable according to the present invention is representatively configured of a cable core and a heat insulating tube accommodating the cable core. Of them, the cable core has a stress relaxation layer, a normal conducting layer, a superconducting conductor layer and an insulating layer as a basic configuration. Normally, the cable core is also provided with a former serving as a member configuring the cable. In that case, for example the former is provided with a stress relaxation layer and a normal conducting conductor layer.

The stress relaxation layer is a layer for absorbing thermal contraction of the normal conducting layer. The normal conducting layer refers to a layer of the cable's constituent materials that is configured of normal conducting material. Representatively, it corresponds to a shunt formed of normal conducting material for shunting a fault current caused in shorting. More specifically, configuring a portion of the former with normal conducting material is included.

The former is disposed at an inner side of the superconducting conductor layer to maintain the superconducting conductor layer to have a predetermined geometry. For the present cable, providing the former with a normal conducting layer and a stress relaxation layer is suitable. For example, the stress relaxation layer is disposed closer to the center and the normal conducting conductor layer is disposed outer than the stress relaxation layer to allow the normal conducting conductor layer to have its amount of radial contraction absorbed by the stress relaxation layer.

The normal conducting layer is formed for example of normal conducting wire. More specifically, the normal conducting wire is copper wire, aluminum wire, or the like. Copper wire and aluminum wire are high in conductivity and thus suitable as an overcurrent shunt. They are also non magnetic and thus preferable in terms of ac loss reduction. The normal conducting wire is not limited to have a particular cross section; it may be round wire or a wire in the form of tape. Normally, the normal conducting conductor layer configuring a portion of the former is wound on a member having a small diameter. Accordingly, the normal conducting wire of round wire is more readily wound. It should be noted, however, that if round wire is used to configure the normal conducting conductor layer, then, to smooth its outer circumferential surface, it is preferable to provide a tape wound layer on the normal conducting conductor layer, use radially smaller normal conducting wire only at and in a vicinity of the outer circumferential surface, or the like.

Preferably, the normal conducting layer is configured to have a stranded wire structure. For example, the normal conducting layer is configured of normal conducting wire wound spirally at an outer side of the stress relaxation layer described later. Spirally winding the normal conducting wire can facilitate the normal conducting wire per se to radially contract when it is cooled. Furthermore the stranded wire structure may be configured of a set of a plurality of segment conductors each configured of a plurality of strands twisted together.

The normal conducting layer is preferably configured of normal conducting wire having its strands insulated. The normal conducting wire formed of insulated strands that is spirally wound allows an eddy-current path between such normal conducting wires to be cut to contribute to smaller loss.

The stress relaxation layer is only required to have an amount of contraction that can absorb at least a portion of that of radial contraction of the normal conducting layer when the cable is cooled by a coolant to cryogenic temperature. The stress relaxation layer is only required to have a configuration formed of material and having a thickness to obtain this predetermined amount of contraction.

The stress relaxation layer can suitably be formed of material of at least one of: kraft paper; plastic tape; and a composite tape of kraft paper and plastic tape. As the plastic tape, polyolefin, polypropylene in particular, can suitably be utilized. Normally, kraft paper is inexpensive, and when it is cooled it contracts in a small amount, however, its cellulose fiber's cushioning effect can be expected. Plastic tape contracts in a large amount when it is cooled. The composite tape of kraft paper and polypropylene is expensive. However, if it uses a large thickness of polypropylene, it can ensure a large amount of contraction, and a cushioning effect of cellulose fiber configuring the kraft paper can also be expected. The stress relaxation layer formed of these materials can prevent the normal conducting wire from experiencing excessive tension when the normal conducting wire has large radial contraction. As the kraft paper, crepe kraft paper or humidity controlling kraft paper can ensure a large amount of contraction. Further, the stress relaxation layer may be formed of one or a combination of these materials to have a thickness allowing absorption of at least a portion of the amount of radial contraction of the normal conducting layer.

At an inner side of the stress relaxation layer, a core member may be disposed. The core member can facilitate forming the stress relaxation layer and also have a diameter to allow the stress relaxation layer to be adjusted in thickness to adjust the amount of contraction of the normal conducting layer that is absorbed. The core member may be hollowed or solid. A specific example of the core member includes a pipe, a spirally formed strip, and the like. Preferably, the pipe is a corrugated pipe, as flexibility is considered. A specific example of the solid core member is a stranded wire structure.

The superconducting conductor layer is a conductor portion configured of superconducting wire. For example, the conductor layer is formed by spirally winding superconducting wire on an outer side of the former in multiple layers. A specific example of the superconducting wire is a superconducting wire in a form of tape in which a plurality of pieces of filaments formed of a Bi 2223 series oxide superconducting material is arranged in a matrix of a silver sheath or the like. The superconducting wire may be wound in a single layer or multiple layers. Normally, to reduce non-uniform current distribution of the conductor layer to reduce ac loss, the superconducting wire is wound in a direction varying for each layer or each plurality of layers or with a pitch varying for each layer or each plurality of layers. Further, when the multiple layers are formed, an interlayer insulating layer may be provided. As the interlayer insulating layer, an interlayer insulating layer provided by winding insulating paper of kraft paper or the like or composite paper of PPLP® produced by Sumitomo Denki Kogyo K.K. or the like is pointed out.

The insulating layer is configured of an insulating material having dielectric strength in accordance with the conductor layer's voltage. For example, at least one of: kraft paper; plastic tape; and a composite tape of kraft paper and plastic tape can suitably be utilized.

Of the above-described materials, a structure configuring the insulating layer only by kraft paper is the most inexpensive. The composite tape and kraft paper composited together can reduce the amount of the composite tape, which is expensive, used to be smaller than when the composite tape is alone used to configure the insulating layer, and the cable's cost can accordingly be reduced.

The insulating layer of the composite tape is preferable in terms of electrical characteristics. Suitably the composite tape is kraft paper and polypropylene film laminated together.

At an outer side of the insulating layer, a superconducting shield layer may be provided. The superconducting shield layer has induced therein a current substantially equal in magnitude to and opposite in direction to that of the superconducting conductor layer to cancel a magnetic field caused from the superconducting conductor layer and thus prevent the magnetic field from externally leaking. The superconducting shield layer is also configured by spirally winding superconducting wire similar to the superconducting conductor layer. Normally, similarly as done for the superconducting conductor layer, the superconducting shield layer is formed of superconducting wire wound in a direction varying for each layer or each predetermined plurality of layers or with a pitch varying for each layer or each predetermined plurality of layers to reduce or prevent non-uniform current distribution.

In contrast, a normal conducting shield layer is a shield layer for example formed of normal conducting material and disposed adjacent to the superconducting shield layer. When the cable is normally in operation, as has been previously described, the superconducting shield layer has induced therein a current substantially equal in magnitude to and opposite in direction to that of the superconducting conductor layer. If a short circuit or the like accidentally occurs and an overcurrent flows through the superconducting conductor layer, and accordingly, the superconducting shield layer also has an overcurrent passing therethrough, the normal conducting shield layer functions to shunt the overcurrent to prevent excessively increased temperature and thus minimize or prevent damage to the superconducting shield layer.

Suitably, as well as the normal conducting conductor layer, the normal conducting shield layer is configured of normal conducting wire and wound spirally. In particular, it is preferable that the normal conducting shield layer is configured of normal conducting wire in the form of tape. The normal conducting shield layer is wound on a member having a larger diameter than that on which the normal conducting conductor layer is wound, and this allows tape wire to be readily wound and a normal conducting shield layer having a required cross section can be formed to be small in thickness. Furthermore, tape wire can provide a significantly smaller gap between such wires than round wire can, which can contribute to an increased (volume) ratio of the normal conducting wire to the normal conducting layer in cross section.

It is suitable that the amount of radial contraction of the normal conducting shield layer is also absorbable by the stress relaxation layer formed at the former, as has been described previously. In other words, when the former radially contracts, the insulating layer becomes radially contractable, which will contribute to the normal conducting shield layer's contraction. The insulating layer per se may also be utilized as a stress relaxation layer for absorbing the radial contraction of the normal conducting shield layer. Utilizing the insulating layer per se as a stress relaxation layer can contribute to a reduced diameter of the cable core.

Further, it is preferable to provide a protection layer at an outermost circumference of the cable core. The protection layer has a function of physically protecting the outer conductor layer and insulating from the heat insulating tube. The protection layer can be formed of insulating paper of kraft paper or the like or plastic tape.

The heat insulating tube may have any structure that can maintain heat insulation of the coolant. For example, a heat insulating material is disposed between an outer tube and an inner tube together forming a double structure of a double tube, and the double tube is vacuumed between the inner and outer tubes. Normally, super insulation formed of a metal foil and a plastic mesh disposed in layers is arranged between the inner tube and the outer tube. The inner tube internally accommodates at least the conductor layer and is filled with a coolant of liquid nitrogen or the like for cooling the conductor layer.

The coolant can maintain superconducting wire in a superconducting state. Although currently it is considered most practical to utilize liquid nitrogen for the coolant, it is also conceivable to utilize liquid helium, liquid hydrogen or the like. In particular, liquid nitrogen provides insulation by liquid that does not cause polypropylene to swell, and if a composite tape using polypropylene is used to configure the insulating layer, a superconducting cable can be provided that has an excellent direct current voltage withstanding characteristic, an excellent Imp. voltage withstanding characteristic and the like.

The above described, present cable preferably has one or a combination of the following configurations:

(1) The normal conducting wire is wound with a pitch 4 to 6 times a winding diameter. The winding diameter refers to a diameter of a member on which the normal conducting wire is wound, that is, an inner diameter of a layer configured of the normal conducting wire. Limiting the ratio of the winding pitch to the winding diameter, as describe above, can provide a winding pitch that is short to reduce the amount of radial contraction of the normal conducting wire caused when the normal conducting wire contracts as it is cooled, and that can also reduce the amount of the normal conducting wire used.

When the pitch of winding the normal conducting wire is reduced, the amount of radial contraction of the normal conducting wire caused when the normal conducting wire contracts as it is cooled, that is, the amount to be absorbed by the stress relaxation layer is also reduced, and accordingly, the stress relaxation layer can easily be formed. However, when the winding pitch is reduced, the amount of the normal conducting wire used is increased to amount to an increase in cost and therefore, it is important to select a winding pitch minimizing or preventing the amount of the normal conducting wire used from increasing. Hence, by limiting the ratio of the winding pitch relative to the winding diameter, as described above, there can be configured a superconducting cable with a short pitch that can reduce the amount of radial contraction of the normal conducting wire caused when the normal conducting wire contracts as it is cooled and that can also relatively reduce the amount of the normal conducting wire used.

A preferable winding pitch of the normal conducting wire can be obtained through trial calculation or actual measurement, as follows. First, there is investigated a relationship between the ratio of the winding pitch to the winding diameter of the normal conducting wire configuring the normal conducting layer, or a "pitch-to-diameter" ratio, and the amount of radial contraction of the normal conducting wire caused when it is cooled. Next, there is investigated a relationship between the pitch-to-diameter ratio and the amount of the normal conducting wire used. Further, there are selected the winding pitch and the winding diameter of the normal conducting wire that can make the amount of radial contraction of the normal conducting wire equal to or smaller than a defined value and can also make the amount the normal conducting wire used equal to or smaller than a defined value.

Note that if the normal conducting layer (the normal conducting conductor layer, the normal conducting shield layer and the like) is configured of normal conducting wire wound in multiple layers, it is preferable that the normal conducting wire is wound in a direction varying for each layer or each predetermined plurality of layers or with a pitch varying for each layer or each predetermined plurality of layers. This can reduce or prevent non-uniform current distribution in the normal conducting layer. If the superconducting wire is thus wound with a varying pitch, it is desirable that in view of the amount of radial contraction and the amount of the wire used, the normal conducting wire is wound with a pitch falling within a range of 4-6 times an inner diameter of a layer configured of the wire.

(2) A semiconductor layer is provided.

For example, a semiconductor layer may be provided at at least one of inner and outer circumferences of the insulating layer, that is, between the superconducting conductor layer and the insulating layer, between the insulating layer and the superconducting shield layer, or the like. The former or inner semiconductor layer and the latter or outer semiconductor layer are effective in stabilizing electrical performance. The semiconductor layer may be configured for example of wound carbon paper.

(3) Bi-based oxide superconducting wire produced in a pressure sintering method is used.

When superconducting wire is spirally wound to configure a superconducting layer (a superconducting conductor layer, a superconducting shield layer and the like), normally in view of reduction/prevention of non-uniform current distribution a variety of different pitches are combined to wind the superconducting wire. In contrast, if superconducting wire is wound with a fixed winding diameter, the wire provides a larger amount of radial contraction for a larger pitch. Accordingly, for some amount absorbed by the stress relaxation layer, it is necessary that superconducting wire wound with a large pitch tolerates an action of stress that accompanies contraction. In that case, if the superconducting wire is excellent in tensile resistance, a superconducting cable that can sufficiently practically be used can be configured. A means for obtaining such superconducting wire excellent in tensile resistance is to employ a pressure sintering method to produce the superconducting wire.

The pressure sintering method is used in a powder-in-tube method used to produce superconducting wire. More specifically, in secondarily sintering source wire for superconducting wire, a gas is used for pressurization to apply external pressure to the wire isotropically. This pressurization can prevent the wire from having a reduced filament density, and superconducting wire having large tensile strength can thus be obtained. The present cable allows the amount of radial contraction of the normal conducting layer to be absorbed by the stress relaxation layer to alleviate an action of stress on the superconducting wire. Nonetheless, stress, tensile stress in particular, may act on the superconducting wire. Superconducting wire excellent in tensile resistance can tolerate action of tension thereon and effectively be prevented from degradation.

In particular, if superconducting wire wound with a varying pitch configures the superconducting layer, it is preferable that superconducting wire wound with a large pitch is superconducting wire obtained in the pressure sintering method. Superconducting wire wound with a large pitch radially contracts in a larger amount than superconducting wire wound with a small pitch, and if the amount of radial contraction is insufficiently absorbed, tension acts on the superconducting wire. Applying superconducting wire that is obtained in the pressure sintering method to superconducting wire on which tension more readily acts can effectively prevent the superconducting wire from degradation.

The gas used in the pressure sintering method for the pressurization is suitably a gaseous mixture of inert gas and oxygen and the pressurization is suitably done with a pressure of 15-30 MPa. The pressure sintering method is indicated for example in "Development of Bismuth-Based Superconducting Wire", Kohei YAMAZAKI et al, *SEI Technical Review*, No. 164, pp. 36-41, March, 2004.

(4) The superconducting wire is provided with a reinforcement layer reinforcing the wire in tensile strength.

While superconducting wire large in tensile strength is preferable as it can tolerate an action of stress thereon, as has been described previously, superconducting wire provided with a reinforcement layer can also have tensile resistance. The reinforcement layer for example includes stainless steel tape bonded on the superconducting wire, enamel or a like resin coating the superconducting wire, and the like.

(5) A holding wound layer and a cushion layer are provided.

A holding wound layer may be provided at an outer side of the superconducting layer (the superconducting conductor layer, the superconducting shield layer and the like). By forming the holding wound layer at the outer side of the superconducting layer, an action fastening the superconducting layer inward can be expected. The fastening action allows the superconducting layer's radial contraction to smoothly behave. The holding wound layer may be configured of any material that can produce a predetermined fastening force at the superconducting layer. For example, metal tape, copper tape in particular, or the like can suitably be utilized.

When the holding wound layer is used, it is also preferable to interpose a cushion layer between the holding wound layer and the superconducting layer. Normally, the superconducting wire is formed of silver or a similar metal, and if the holding wound layer is formed of metal tape, the holding wound layer and the superconducting layer will have their respective metals contact each other, and the superconducting wire may be damaged. The two layers with the cushion layer posed therebetween can avoid having their respective metals directly contacting each other, and the superconducting wire can be protected from damage. Specifically, the cushion layer can suitably be formed of insulating paper, carbon paper, or the like.

Effects of the Invention

The present superconducting cable can achieve the following effects:

(1) The stress relaxation layer provided at the inner side of the normal conducting layer can absorb at least a portion of an amount corresponding to that of radial contraction of the normal conducting layer that accompanies contraction of the normal conducting wire caused as it is cooled. This can also alleviate or resolve an action of stress on superconducting wire wound with a short pitch, in particular.

(2) At least a portion of an amount corresponding to that of radial contraction of the normal conducting layer can be absorbed by the stress relaxation layer to reduce tension acting on a cable core and hence reduce stress exerted to a cable terminal. Accordingly, the cable terminal can be designed in a simple manner. Furthermore, as tension acting on the cable core is reduced, the heat insulating layer can also be prevented from having reduced heat insulation attributed to side pressure of a bent portion of the cable.

(3) By providing the cable core per se with a mechanism absorbing thermal contraction, at least a portion of an amount of contraction of normal conducting wire and superconducting wire can be absorbed not only for a multi-core superconducting cable but also a mono-core superconducting cable for which conventionally it has been considered difficult to have the absorption mechanism. Three-core or similar multicore cables can be twisted with a reduced slack and thus have a reduced outer diameter.

(4) By providing a pitch of winding the normal conducting wire that is 4 through 6 times a winding diameter thereof, there can be provided a superconducting cable that is capable of absorbing by a simple configuration the amount of contraction of the normal conducting wire caused when it is cooled and that is also capable of minimizing the amount of the normal conducting wire used.

BEST MODES FOR CARRYING OUT THE INVENTION

Hereinafter the present invention in embodiments will be described.

First Embodiment

General Structure

As shown in FIG. 1, the present invention provides an ac superconducting cable 100 configured of a single cable core 10 and a heat insulating tube 20 accommodating the core 18.

Core

Core 10 has, as seen at its center outward, a former 11, a superconducting conductor layer 12, a cushion layer 13, a holding wound layer 14, an insulating layer 15, a superconducting shield layer 16, a normal conducting shield layer 17, and a protection layer 18.

Former

Former 11 is a member serving as a core for forming superconducting conductor layer 12 formed of superconducting wire, and includes, as seen at its center outward, a core member 11A, a stress relaxation layer 11B and a normal conducting conductor layer 11C. Herein, core member 11A is formed of a spiral steel strip, and insulating tape is wound on core member 11A to provide stress relaxation layer 11B, and furthermore, normal conducting wire is wound on stress relaxation layer 11B to provide normal conducting conductor layer 11C.

Core member 11A is a member that is wound to serve as a core for forming stress relaxation layer 11B. It is configured of a 6 mm wide and 0.8 mm thick, SUS316 steel strip spirally wound.

Stress relaxation layer 11B is formed of a material and has a thickness that are selected to absorb an amount of radial contraction of normal conducting conductor layer 11C caused when it thermally contracts. More specifically, an insulating tape is used that is formed of a composite tape PPLP® produced by Sumitomo Denki Kogyo K.K. and formed of kraft paper and polypropylene film laminated together. The ratio in thickness of the polypropylene film to the entirety of the composite tape of the PPLP is 60%.

Furthermore, normal conducting conductor layer 11C serves to shunt a fault current to protect superconducting conductor layer 12 in accidental shortings or the like from an excessive fault current otherwise passing through and damaging superconducting conductor layer 12. Herein it is formed of polyvinyl fluoride-coated copper wire wound spirally on stress relaxation layer 11B. Normal conducting conductor layer 11C is configured of two layers: a radially inner layer is configured of copper wire having a diameter of 1.5 mm and a radially outer layer is configured of copper wire having a diameter of 1.1 mm. Normal conducting conductor layer 11C has the layers wound in a direction of S-Z in order, as seen at the inner layer toward the outer layer.

Superconducting Conductor Layer

Superconducting conductor layer 12 is implemented by a 0.24 mm thick and 3.8 mm wide, Bi 2223 series Ag—Mn sheath tape wire. This tape wire is produced in a pressure sintering method. The tape wire is wound on former 11 (normal conducting conductor layer 11C) in multiple layers to configure superconducting conductor layer 12. Herein, superconducting wire is wound in 4 layers in a direction of S-S-Z-Z in order, as seen at the innermost layer outward.

Cushion Layer and Holding Wound Layer

On the superconducting conductor layer 12, the cushion layer 13 is disposed, and thereon, the holding wound layer 14 is further disposed. The cushion layer 13 is configured by winding several layers of kraft paper on the superconducting conductor layer 12, and the holding wound layer 14 is formed by winding copper tape. The cushion layer 13 prevents the superconducting conductor layer 12 and the holding wound layer 14 from having their respective metals contacting each other, and the holding wound layer 14 holds the superconducting conductor layer 12 tight via the cushion layer 13 inward so that when the cable is cooled the superconducting conductor layer 12's radial contraction and furthermore the normal conducting conductor layer 11C's radial contraction can smoothly behave.

Insulating Layer

The insulating layer 15 is formed on the holding wound layer 14. The insulating layer 15 has a function of electrical insulation for alternate current passing through conductor layer 12. Herein, PPLP is used to configure the insulating layer 15. The insulating layer 15 also has a function serving as an outer stress relaxation layer for absorbing an amount of radial contraction of normal conducting shield layer 17 caused as normal conducting shield layer 17 is cooled, as will be described later. The insulating layer 15 that per se serves as an outer stress relaxation layer can eliminate the necessity of separately providing the outer stress relaxation layer, and the cable core can be prevented from having a large outer diameter.

Further, although not shown, an inner semiconductor layer is provided at an inner circumferential side of the insulating layer 15 and an outer semiconductor layer is provided at an outer circumferential side of the insulating layer 15. The semiconductor layers are both formed of wound carbon paper.

Superconducting Shield Layer

Outside the insulating layer 15, the superconducting shield layer 16 is provided. When the cable is in operation, the superconducting shield layer 16 has induced therein a current substantially equal in magnitude to and opposite in direction to that of superconducting conductor layer 12 to cancel a magnetic field caused from superconducting conductor layer 12 and thus prevent the magnetic field from externally leaking. Herein, it is configured of superconducting wire similar to superconducting conductor layer 12. More specifically, it is configured of two layers wound in a direction of S-S.

Normal Conducting Shield Layer

Subsequently, the normal conducting shield layer 17 is disposed on the superconducting shield layer 16. Normal conducting shield layer 17 serves to shunt a fault current to protect the superconducting shield layer 16 in accidental shortings or the like from an excessive fault current induced in and damaging the superconducting shield layer 16. Herein it is formed of polyvinyl fluoride-coated copper wire wound spirally on the superconducting shield layer 16. The normal conducting shield layer 17 is configured of copper wire in a form of tape and wound in two layers. The normal conducting shield layer 17 has the layers wound in a direction of S-Z in order, as seen at the inner layer toward the outer layer.

Protection Layer

An outer side of the normal conducting shield layer 17 is provided with the protection layer 18 formed of an insulating material. Herein, the protection layer 18 is configured of wound kraft paper. By the protection layer 18, the normal conducting shield layer 17 can be physically protected, the heat insulating tube (inner tube 21) can be insulated, and a shunt of an induced current to the heat insulating tube 20 can be prevented.

Heat Insulating Tube

The heat insulating tube 20 is a double tube including inner tube 21 and outer tube 22 and a vacuumed heat insulating layer is provided between the inner and outer tubes 21 and 22. Inside the vacuumed heat insulating layer is arranged a so-called super insulation formed of a plastic mesh and a metal foil deposited in layers. A space formed between the inner side of the inner tube 21 and the core 10 provides a coolant flow path. Further, a corrosion resistant layer 23 maybe formed of polyvinyl chloride or the like at an outer circumference of the heat insulating tube 20, as necessary.

Exemplary Trial Calculation

In fabricating the above superconducting cable, the following trial calculation is carried out such that the amount of the normal conducting wire used can be minimized while aiming at winding the normal conducting wire with a short pitch to reduce the amount of radial contraction of the normal conducting wire.

First, there is investigated a relationship between the ratio of the winding pitch to the winding diameter of the normal conducting wire configuring the normal conducting layer, or a pitch-to-diameter ratio, and the amount of radial contraction of the normal conducting wire. Herein, three winding diameters of 20 mmφ, 30 mmφ, and 40 mmφ are applied, and a pitch-to-diameter ratio for each diameter, and an amount of radial contraction provided if the normal conducting wire contracts by 0.3% when the cable is cooled in operation are calculated through a trial calculation using each material's linear expansion coefficient. A result thereof is shown in the graph of FIG. 2.

As shown in the graph, it can bee seen that for a single pitch-to-diameter ratio, the larger the winding diameter, the smaller the amount of radial contraction. Further, it can also be seen that for a single winding diameter, the smaller the pitch-to-diameter ratio, the smaller the amount of radial contraction. It can be seen from this result that when a short pitch is selected the amount of radial contraction to be absorbed is small.

Next, a relationship between the pitch-to-diameter ratio and the amount of the normal conducting wire used is investigated. Herein, the amount of the normal conducting wire used when the normal conducting wire is placed along a longitudinal direction of an object on which the normal conducting wire is wound, that is, when the normal conducting wire is longitudinally placed, assumes a value of 1.0, and how the amount of the normal conducting wire used varies when the pitch-to-diameter ratio is changed is indicated by a relative value. A result thereof is shown in the graph of FIG. 3.

As shown in the graph, it can be seen that while the amount of the normal conducting wire used is not extremely increased for a pitch-to-diameter ratio up to approximately 6.0, the amount of the normal conducting wire used rapidly increases when the ratio reaches less than 4.0.

It can be seen from the two trial calculation results that a pitch-to-diameter ratio of approximately 4.0 to 6.0 is an extent that allows the cooled normal conducting wire's contraction to be readily absorbed and also reduces the amount of the normal conducting wire used.

INDUSTRIAL APPLICABILITY

The superconducting cable according to the present invention can be utilized as electric power transmitting means. The superconducting cable according to the present invention can suitably be utilized in particular as monocore ac power transmitting means.

DESCRIPTION OF THE REFERENCE SIGNS

Figure 1:
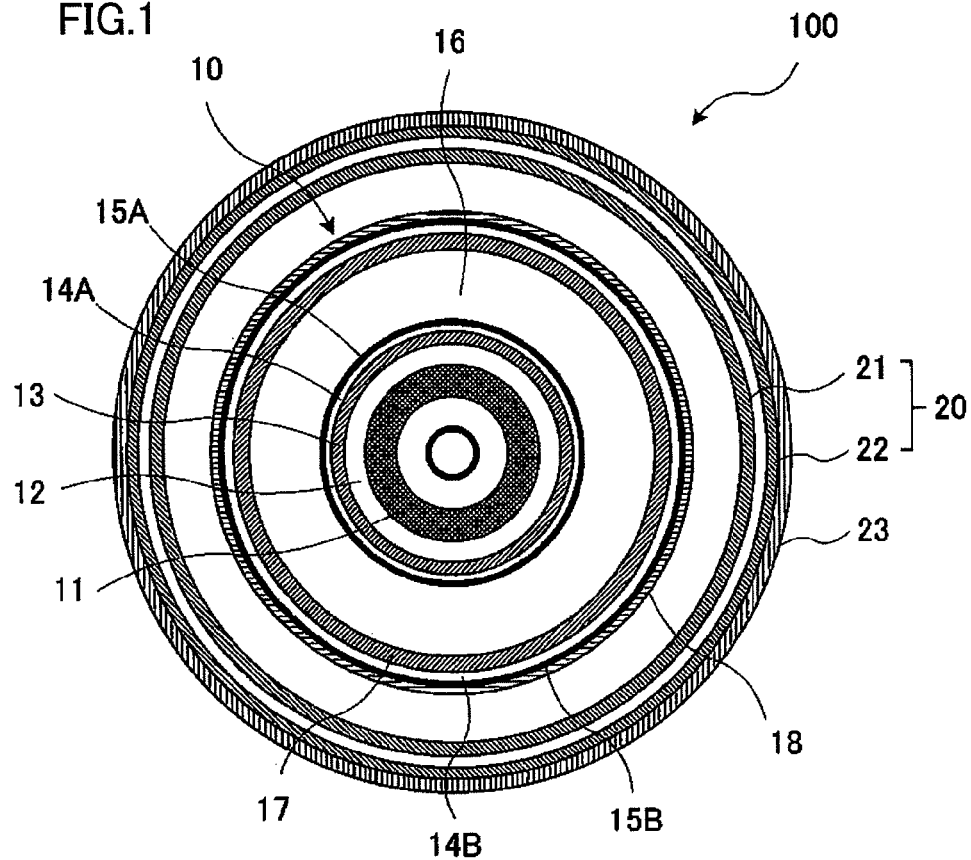
FIG. 1 is a lateral cross-sectional view of the superconducting cable according to the present invention.
Figure 2:
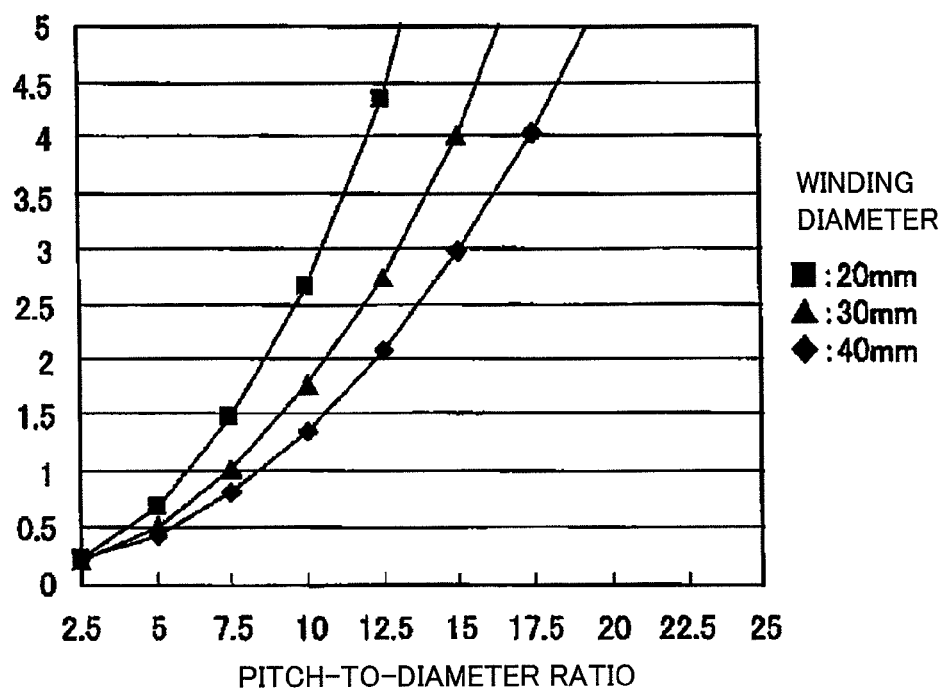
FIG. 2 is a graph showing a relationship between a pitch-to-diameter ratio and an amount of radial contraction of normal conducting wire caused when it is cooled.
Figure 3:
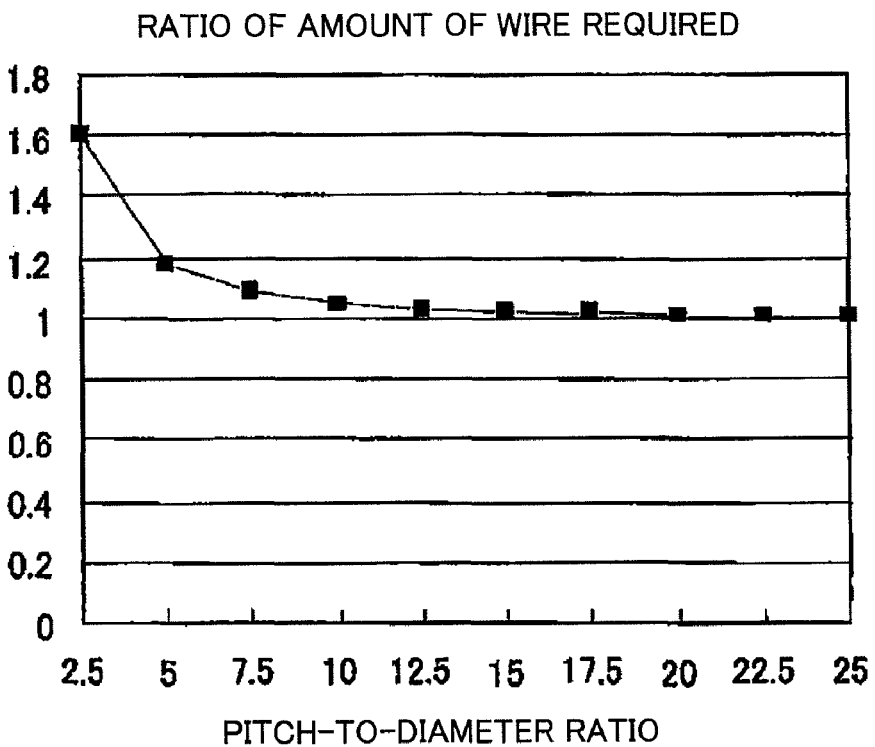
FIG. 3 is a graph showing a relationship between a pitch-to-diameter ratio and the amount of normal conducting wire used.
Figure 4:
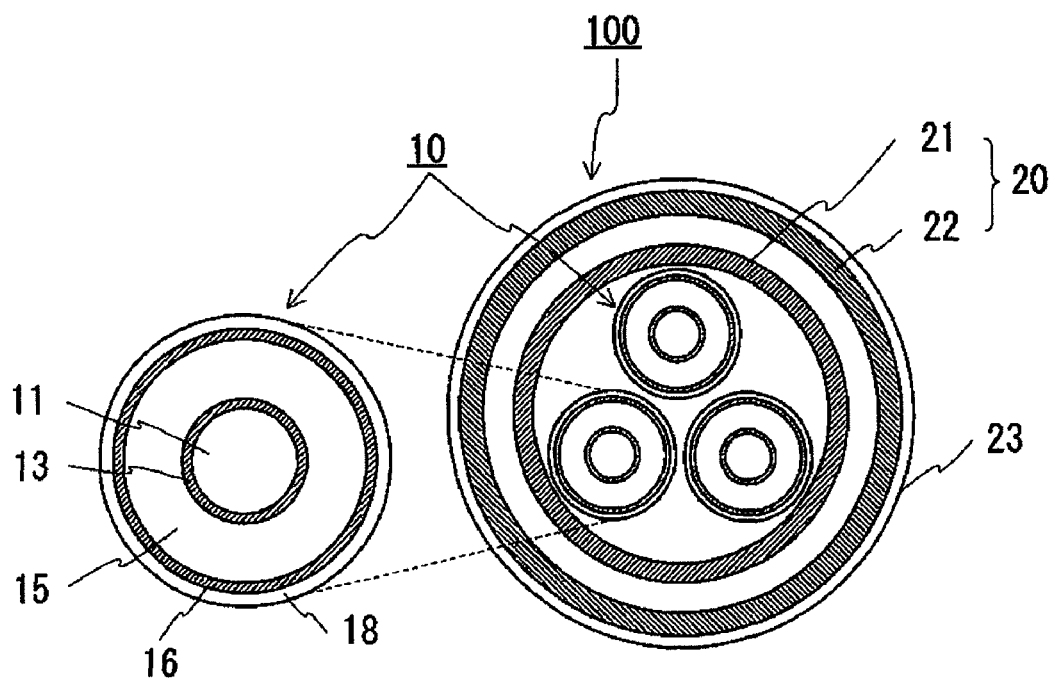
FIG. 4 is a lateral cross-sectional view of a conventional superconducting cable.

100: superconducting cable
10: core
11: former, 11A: core member, 11B: stress relaxation layer, 11C: normal conducting conductor layer
12: superconducting conductor layer, 13: cushion layer, 14: holding wound layer
15: insulating layer, 16: superconducting shield layer, 17: normal conducting shield layer,
18: protection layer
20: heat insulating tube
21: inner tube, 22: outer tube, 23: corrosion resistant layer

The invention claimed is:

1. A superconducting cable comprising a cable core including a superconducting layer and a normal conducting layer disposed at at least one of inner and outer sides of said superconducting layer, the superconducting cable being configured to:
   have said normal conducting layer serve as a path for a fault current in an accident;
   have a stress relaxation layer including kraft paper at an inner side of said normal conducting layer;
   have a core member at an inner side of said stress relaxation layer; and
   have said stress relaxation layer absorb at least a portion of an amount of radial contraction of said normal conducting layer caused as it is cooled by a coolant.

2. The superconducting cable according to claim 1, wherein said normal conducting layer is configured of spirally wound normal conducting wire.

3. The superconducting cable according to claim 2, wherein said normal conducting wire is wound with a pitch four to six times a winding diameter of said normal conducting wire.

4. The superconducting cable according to any of claims 1-3, comprising a former, a superconducting conductor layer disposed at an outer side of said former as a superconducting layer, and an insulating layer disposed at an outer side of said superconducting conductor layer, wherein said former has said normal conducting layer and said stress relaxation layer.

5. The superconducting cable according to claim 4, further comprising:

a superconducting shield layer disposed at an outer side of said insulating layer as a superconducting layer; and a normal conducting shield layer disposed at an outer side of said superconducting shield layer as a normal conducting layer.

6. The superconducting cable according to any of claims 1-3, wherein:

said superconducting layer is configured of superconducting wire; and said superconducting wire is Bi-based oxide superconducting wire produced in a pressure sintering method.

7. The superconducting cable according to any of claims 1-3, wherein:

said superconducting layer is configured of superconducting wire; and said superconducting wire is provided with a reinforcement layer reinforcing said superconducting wire in tensile strength.

8. The superconducting cable according to any of claims 1-3, wherein said stress relaxation layer is configured of at least one of: kraft paper; and a composite tape of kraft paper and plastic tape.

\* \* \* \* \*